(12) United States Patent
Pinder

(10) Patent No.: US 7,155,254 B2
(45) Date of Patent: Dec. 26, 2006

(54) METHOD AND APPARATUS TO SELF-CONFIGURE AN ACCESSORY DEVICE

(75) Inventor: Ellis A. Pinder, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 144 days.

(21) Appl. No.: 10/669,034

(22) Filed: Sep. 23, 2003

(65) Prior Publication Data

US 2005/0064905 A1  Mar. 24, 2005

(51) Int. Cl.
*H04B 1/38* (2006.01)
*H04B 1/18* (2006.01)
*H04M 1/00* (2006.01)

(52) U.S. Cl. .............. 455/557; 455/556.1; 455/186.1

(58) Field of Classification Search ............ 455/556.1, 455/557, 186.1, 551, 558
See application file for complete search history.

(56) References Cited

U.S. PATENT DOCUMENTS

| | | | | |
|---|---|---|---|---|
| 5,729,603 | A * | 3/1998 | Huddart et al. ........ | 379/395.01 |
| 6,097,943 | A * | 8/2000 | Nordwall ................ | 455/418 |
| 6,122,528 | A * | 9/2000 | Garcia et al. ........... | 455/558 |
| 6,133,847 | A * | 10/2000 | Yang ...................... | 340/825.22 |
| 6,301,626 | B1 * | 10/2001 | Knox ...................... | 710/10 |
| 6,378,016 | B1 * | 4/2002 | Noguchi ................. | 710/104 |
| 6,397,327 | B1 * | 5/2002 | Klebanov .............. | 713/1 |
| 6,418,486 | B1 * | 7/2002 | Lortz et al. ............. | 710/10 |
| 6,603,986 | B1 * | 8/2003 | Bozoukov .............. | 455/569.2 |
| 6,823,526 | B1 * | 11/2004 | Howard et al. ......... | 719/327 |
| 6,961,587 | B1 * | 11/2005 | Vilppula et al. ........ | 455/558 |
| 2001/0048024 | A1 * | 12/2001 | Yap et al. ............... | 235/380 |
| 2002/0042289 | A1 * | 4/2002 | Kabatek ................. | 455/557 |
| 2002/0173339 | A1 * | 11/2002 | Safadi ................... | 455/553 |
| 2003/0005192 | A1 * | 1/2003 | Swope et al. .......... | 710/104 |
| 2003/0162562 | A1 * | 8/2003 | Curtiss et al. .......... | 455/556 |
| 2004/0005910 | A1 * | 1/2004 | Tom ....................... | 455/558 |
| 2004/0033478 | A1 * | 2/2004 | Knowles ................ | 434/350 |
| 2004/0152457 | A1 * | 8/2004 | Goldstein et al. ...... | 455/419 |
| 2004/0192274 | A1 * | 9/2004 | Vuori .................... | 455/418 |
| 2005/0014531 | A1 * | 1/2005 | Findikli ................. | 455/557 |
| 2005/0022212 | A1 * | 1/2005 | Bowen .................. | 719/321 |
| 2005/0249354 | A1 * | 11/2005 | Patino et al. ........... | 381/59 |
| 2006/0069813 | A1 * | 3/2006 | Biamonte et al. ....... | 710/8 |

FOREIGN PATENT DOCUMENTS

WO    WO 9953621 A1 * 10/1999

* cited by examiner

*Primary Examiner*—Lester G. Kincaid
*Assistant Examiner*—Marivelisse Santiago-Cordero
(74) *Attorney, Agent, or Firm*—Barbara R. Doutre

(57) ABSTRACT

A method (200) for self-configuring a smart accessory allows for a common platform to be used for a variety of accessory options. The presence of an optional mechanical, electrical, and/or software configuration is detected (206) and compared to accessory parameter data associated with the identification and operation of the accessory (210). If the data and options do not match, the parameter data gets updated so as to self-configure the accessory to the detected optional configuration (212).

26 Claims, 2 Drawing Sheets

METHOD AND APPARATUS TO SELF-CONFIGURE AN ACCESSORY DEVICE

CROSS RELATED APPLICATION

This application is related to pending by Pinder et al, entitled "Interface System for an Accessory and a Communication Device" this is a continuation of application Ser. No. 10/669,034, filed Sep. 23, 2003, and assigned to Motorola, Inc. being filed concurrently herewith and pending by Higgins et al.; entitled "Audio Accessory Optimization System" and assigned to Motorola. Inc. being filed concurrently herewith.

TECHNICAL FIELD

This invention relates in general to accessories for communication devices, and more particularly the identification of an accessory by a communication device.

BACKGROUND

Many of today's communication devices, such as two-way radios and cell phones, connect to an array of accessories that are of varying complexity. Some of these accessories contain a microprocessor and are considered "smart", while others are less complex. Radio accessories often need to be identified to properly activate support for the accessory. Differentiation amongst accessories can be provided by software, electrical modules, or by mechanical differences within the accessories. To differentiate accessories using mechanical differences requires addressing the practical limits of external accessory density and size. A modular design minimizes engineering development resources by allowing generic devices to be built and then customized quickly based on customer demand. The use of modular designs, however, can complicate device identification because the device identification information may have to be changed when the accessory is modified, reconfigured, or upgraded. Having to re-program the information is highly undesirable, and if the upgrade or re-configuration is performed by the customer, may not even be possible.

Accordingly, there is a need for a common accessory platform that can be used for multiple accessory configurations and which allows the accessory to reconfigure itself.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
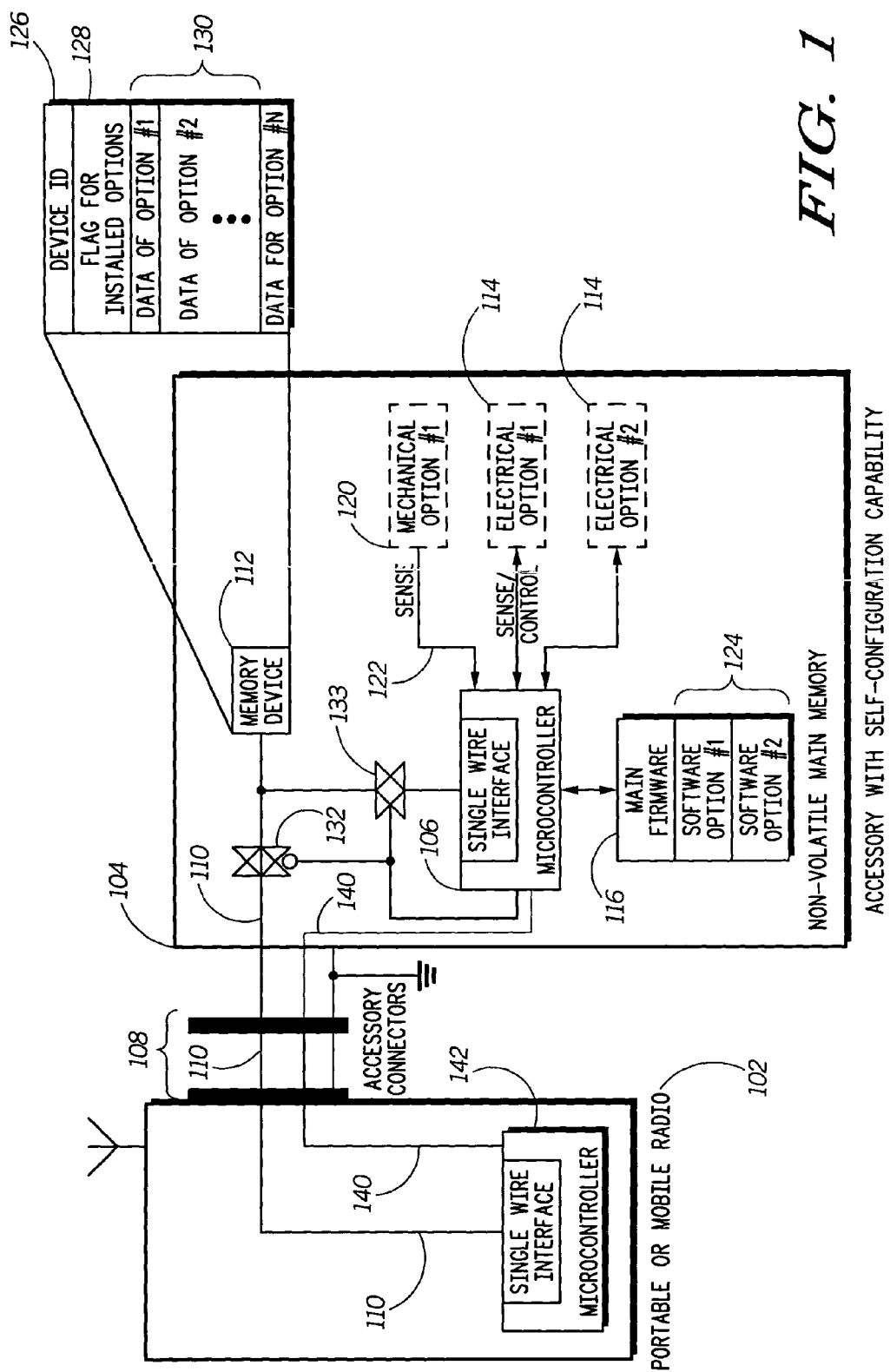
FIG. 1 is a block diagram of an accessory with self-configuration capability in accordance with the present invention.

While the specification concludes with claims defining the features of the invention that are regarded as novel, it is believed that the invention will be better understood from a consideration of the following description in conjunction with the drawing figures, in which like reference numerals are carried forward.

In accordance with the present invention, there is provided herein an accessory platform that allows for multiple accessory configurations. The accessory is able to reconfigure itself by updating operating parameters stored in accessory memory when optional operating configurations are detected.

FIG. 1 is a block diagram of a radio 102 and an accessory 104 with self-configuration capability formed in accordance with the present invention. Accessory 104 includes a microcontroller 106 making it a "smart" accessory. An interface 108 couples the accessory 104 to radio 102 via a serial data bus 110. In accordance with the present invention, accessory 104 contains at least one embedded serial memory device 112 containing information pertaining to accessory parameters, such as identification ID, accessory type, and port configuration information. For the embodiment shown in FIG. 1, a single wire representation is shown wherein embedded memory 112 is a single wire type device being accessed by serial bus 110 via switches 132, 133 under the control of accessory controller 106. A main communication bus 140, such as RS-232 or USB, is available for data communication between radio microcontroller 142 and accessory microcontroller 106.

The serial memory device 112 may be one of many different types of serial memory devices, such as a single wire 1—Wire® device from Dallas Semiconductor, a two wire I²C™ device available from Phillips Electronics, or a three wire Serial Peripheral Interface (SPI) memory device to name but a few. The serial data bus 110 provides bi-directional data and optionally clock signals to and from the serial memory device 112. Depending on the device type, the serial data bus 110 may also provide power to serial memory device 112.

The smart accessory 104 of the present invention includes at least one and preferably a plurality of optional and selectable configurations with which to self-configure the accessory. These configurations can encompass mechanical, electrical, and/or software configurations. The smart accessory 104 of FIG. 1 optionally contains electrical functional modules 114 whose presence enhances the capabilities of the device, shown in FIG. 1 by "Electrical Option #1" and "Electrical Option #2". These electrical modules 114 may be user-installed or factory installed. The factory-installed options may share the same printed circuit board as the accessory with installation consisting of placement of the appropriate parts. One example of an electrical option in accordance with the present invention is a GPS plug-in board to a smart microphone.

The smart accessory 104 optionally includes multiple mechanical configurations 120 with substantially identical electrical components and identical software to support all configurations. Sensors and/or sense lines 122 indicate to the microcontroller 106 what configuration is present and direct the software to operate accordingly. An example would be a smart microphone that can have two configurations: a standard half-duplex configuration and an optional full duplex configuration replacing or supplementing the half duplex configuration. The configuration is determined late in the manufacturing process and might even be changed by the customer after the accessory is purchased. The accessory software senses the presence of the full-duplex option if it is present and will update the configuration data 130 if it differs from the detected configuration. The radio, upon detecting the new configuration, will adjust operation accordingly.

The smart accessory 104 may further include software options 124 within a non-volatile program memory 116. These software options extend and enhance the operation of the accessory. Such options can be installed after production during a customization stage, or by a customer using a programming fixture or even the radio itself. The software options 124 can optionally be present all along and can be activated during customization or during a radio upgrade.

For the embodiment shown in FIG. 1, the serial memory device 112 includes device ID 126, and further includes flags 128 installed to enable software options and data 130 for the electrical and mechanical options.

Switches 132, 133 are used to ensure exclusive access to serial memory device 112. When switch 132 is open, then switch 133 is closed, thereby providing local access to memory device 112 via accessory controller 106. When switch 132 is closed and switch 133 is open, the memory 112 is accessed remotely from radio microcontroller 142. The serial memory device 112 is thus accessible through either local access or remote access, but cannot be accessed by both at the same time.

Figure 2:
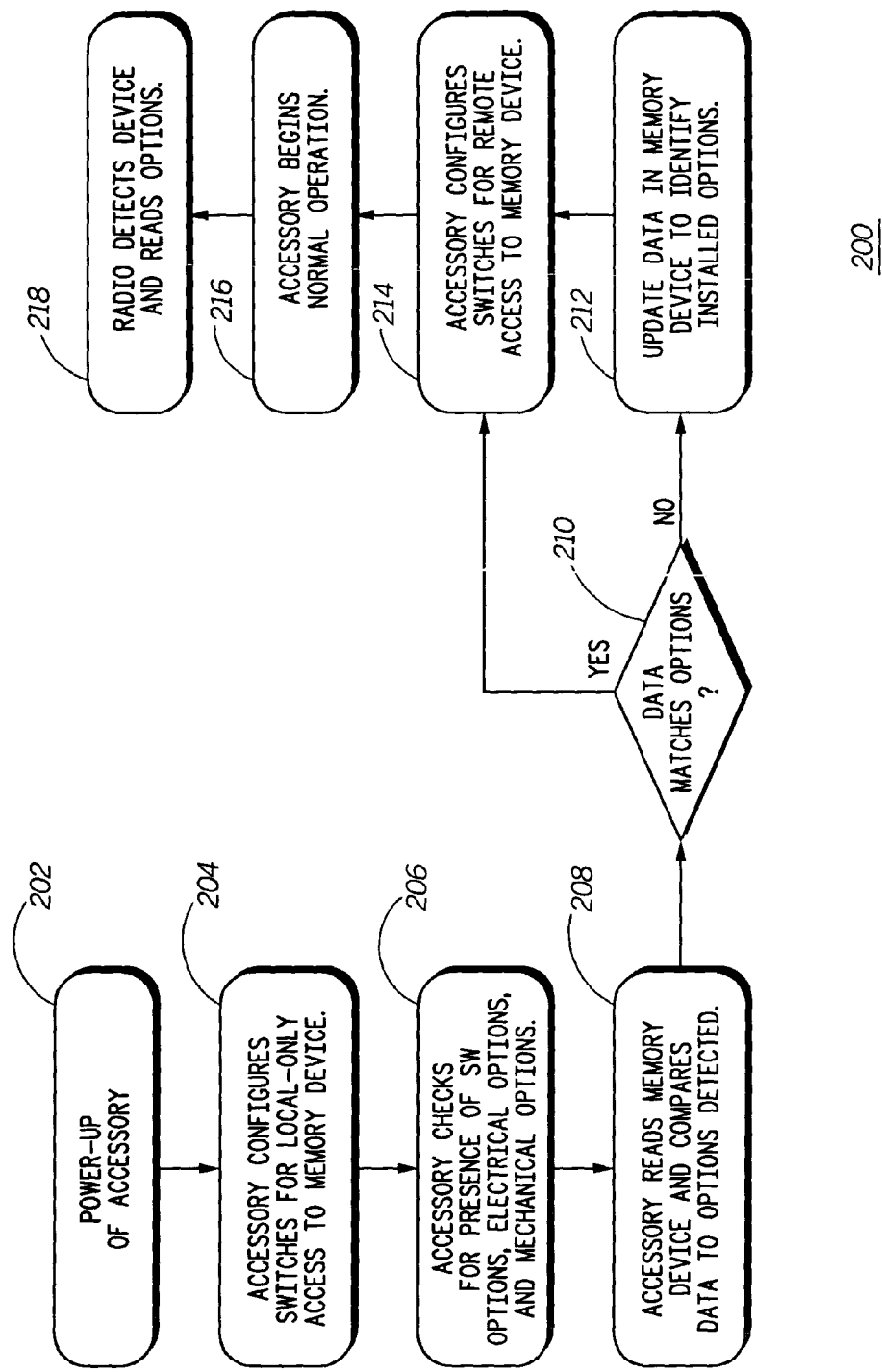
FIG. 2 is a flow chart for a method of self-configuring an accessory in accordance with a preferred embodiment of the invention.

A method 200 for self-configuring an accessory in accordance with the present invention is shown in FIG. 2. Upon power-up of the accessory at step 202, the accessory configures switches for local access (i.e. access by accessory controller 106) to the serial memory device at step 204. The accessory, at step 206, checks the sense lines for mechanical options or special configurations, checks sense lines or uses other interface means to detect the presence of any electrical options and checks program memory for the presence of software options or alternatively security flags that activate them. At step 208, upon determining the options available, the accessory microcontroller reads the device parameter data out of the serial memory device and performs a comparison at step 210. If the parameter data does not match the actual detected configuration of the accessory, then the parameter data is updated by the accessory microcontroller 106 at step 212 to reflect the options detected. If the parameter data does match at step 210, or after an update of the data at step 212, the accessory configures its switches to allow remote access (i.e. radio access) to the serial memory device at step 214. The accessory begins normal operation at step 216 and the radio detects the presence of the accessory and reads the detected options at step 218. The radio reads the parameter data, configures its accessory port, activates appropriate protocols, and activates radio software functionality to properly interface with and utilize the smart accessory and its detected options.

An example of a self-configuring accessory formed in accordance with the present invention is an accessory using the same software and printed circuit board for a single accessory that provides both a keypad microphone option and a keypad microphone with display and earpiece option. The accessory automatically self-configures its parameter information and when connected to the radio, the radio determines whether there is a remote display and whether the microphone has full duplex audio capability. Radio software may behave differently based on the presence or absence of these options.

Another example of a self-configuring accessory formed in accordance with the present invention is an accessory with a Global Positioning System electrical option. An add-on GPS module is placed inside the accessory. Upon subsequent power-up of the accessory, the accessory detects that its actual configuration differs from its configuration stored in the serial memory device. The accessory updates the stored configuration so the radio will detect the accessory as a GPS microphone and not a normal microphone.

The self-configuring accessory of the present invention thus eliminates the programming or updating of identifying information if the accessory is re-configured or upgraded. Furthermore, the self-configuring accessory eliminates the need for initial programming of the parameter data. When the accessory's microcontroller reads the serial memory device for the first time, it may find nothing. The accessory controller then loads a default image for that accessory and customizes it further based on discovered electrical, mechanical, and software options. This eliminates a process step and the need for a programming fixture during production.

Accordingly, there has been provided self-configuring accessory that allows one accessory to be configured and reconfigured if desired for multiple accessory options, whether they are electrical, mechanical, and/or software options. The preferred embodiment of the invention utilizes a single wire protocol because of its simplicity and low cost. Those skilled in the art will recognize that a variety of memory devices and buses may be used to implement the present invention without diminishing its scope or purpose, and that the memory device might even share the primary accessory communication bus.

There are several advantages to the self-configuring device identification technique of the present invention. Generic accessory devices can now be built and customized quickly based on customer demand. An accessory can now be modified, reconfigured, or upgraded without having to go through an entire mechanical or electrical reconfiguration of the accessory or the communication device. A communication device is now able to determine not only the type of accessory, but also the presence of options or special configurations associated with that accessory and thereby modify its operation to utilize the options or special configurations.

Initial programming of device parameter data in the smart accessory is eliminated. Additional options or re-configuration during a customization phase is easily handled, with the device automatically detecting and updating its parameter information. If desired, some options can be made customer-installable as upgrades, with the smart accessory automatically detecting and updating its parameter information.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An interface configuration for an accessory of a radio, comprising:
   at the accessory:
      an accessory microcontroller;
      at least one accessory option for installation into the accessory, the at least one accessory option detected by the accessory microcontroller; and
      a serial memory device coupled to the accessory microcontroller, the serial memory device having accessory data stored therein, the accessory microcontroller reading the serial memory device and comparing the accessory data to the at least one detected accessory option, the accessory updating the serial memory device with the detected accessory option for self-configuration without accessing the radio.

2. The interface configuration of claim 1, wherein the serial memory device is accessible locally from the accessory microcontroller, and the serial memory device is accessible remotely from a radio microcontroller.

3. The interface configuration of claim 2, further comprising a data bus for data communication between the radio microcontroller and the accessory microcontroller.

4. The interface configuration of claim 1, wherein the at least one accessory option is updatable.

5. The interface configuration of claim 1, wherein the at least one accessory option is user-installed.

6. The interface configuration of claim 1, wherein the at least one accessory option is factory-installed.

7. A smart accessory for a communication device, the accessory comprising:
a memory device having accessory parameter data stored therein, the parameter data being accessible locally by the smart accessory and remotely by the communication device;
installable modules for storing optional operating configurations within the smart accessory; and
wherein the smart accessory self-configures itself, without accessing the communication device, to operate over at least one of the optional operating configurations based on the parameter data, and the communication device adjust its operation in response thereto.

8. The smart accessory of claim 7, wherein the optional operating configurations include software options.

9. The smart accessory of claim 7, wherein the optional operating configurations include mechanical options.

10. The smart accessory of claim 7, wherein the optional operating configurations include electrical options.

11. The smart accessory of claim 7, wherein the optional operating configurations include software, mechanical, and electrical options.

12. The smart accessory of claim 7, wherein the installable modules are user-installed.

13. The smart accessory of claim 7, wherein the installable modules are factory-installed.

14. The smart accessory of claim 7, wherein some of the installable modules are user-installed and others are factory-installed.

15. A method for self-configuring a smart accessory for a communication device, comprising the steps of:
providing a common electrical, mechanical, and software platform for the accessory with optional electrical, mechanical, and software configurations therein;
providing a memory device having accessory parameter data stored therein;
installing an optional configuration into the accessory;
detecting the presence of the optional configuration at the accessory; and
updating the accessory parameter data of the memory device so as to self-configure the accessory to the detected optional configuration, the steps of providing through updating being performed to the accessory independently of the communication device.

16. The method of claim 15, further comprising the step of adjusting the communication device based on the accessory configuration.

17. A method for self-configuring an accessory to a radio, comprising:
at the accessory performing the steps of:
powering up an accessory having a serial memory device contained therein;
detecting the presence of options including mechanical, electrical, and software options within the accessory;
reading accessory parameter data from the serial memory device;
comparing the accessory parameter data to the detected options;
configuring the accessory for the detected options if the step of comparing did not result in a match;
the steps of powering up through configuring being performed without accessing the radio;
at the radio performing the step of:
detecting the presence of the accessory by the radio; and
operating the radio and the accessory in accordance with the detected options.

18. The method of claim 17, further comprising the step of installing the options.

19. An interface configuration for an accessory to be used with a communication device, comprising:
at the accessory:
an accessory microcontroller;
accessory options coupled to the accessory microcontroller; and
a serial memory device coupled to the accessory microcontroller, the serial memory device containing parameter data for the accessory that is accessible locally from the accessory microcontroller, the accessory microcontroller verifying and updating the parameter data to correspond with the accessory options without accessing the communication device; and
the updated parameter data from the accessory being available remotely to the communication device for operation of the accessory with the radio.

20. The interface configuration of claim 19, wherein the serial memory device is a single wire device.

21. The interface configuration of claim 19, wherein the serial memory device is a two wire device.

22. The interface configuration of claim 19, wherein the serial memory device is a three wire device.

23. The interface configuration of claim 19, wherein the accessory options include at least one of software, mechanical, and electrical options.

24. The interface configuration of claim 19, wherein the accessory options are user-installed.

25. The interface configuration of claim 19, wherein the accessory options are factory-installed.

26. The interface configuration of claim 19, wherein some of the accessory options are user-installed and others are factory-installed.

* * * * *